United States Patent
Vu et al.

(10) Patent No.: US 8,560,224 B2
(45) Date of Patent: Oct. 15, 2013

(54) METHOD AND APPARATUS FOR ESTABLISHING OPTIMUM ROUTE TO INTERSECTION DESTINATION FOR NAVIGATION SYSTEM

(75) Inventors: Tien Vu, Torrance, CA (US); Lei Zhao, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 562 days.

(21) Appl. No.: 12/082,722

(22) Filed: Apr. 14, 2008

(65) Prior Publication Data
US 2009/0259394 A1    Oct. 15, 2009

(51) Int. Cl.
*G01C 21/00* (2006.01)
*G01C 21/34* (2006.01)
*G08G 1/123* (2006.01)

(52) U.S. Cl.
USPC .......................................... 701/410; 701/411

(58) Field of Classification Search
USPC .................. 701/200, 201, 202, 208, 410–411
See application file for complete search history.

(56) References Cited

U.S. PATENT DOCUMENTS

| 5,893,898 A * | 4/1999 | Tanimoto ...................... 701/437 |
| 2006/0217882 A1 * | 9/2006 | Takashima et al. ........... 701/208 |

FOREIGN PATENT DOCUMENTS

JP    10-89987    4/1998

* cited by examiner

*Primary Examiner* — Thomas Tarcza
*Assistant Examiner* — Imran Mustafa
(74) *Attorney, Agent, or Firm* — Muramatsu & Associates

(57) ABSTRACT

A method and apparatus for a navigation system for calculating a route to an intersection destination establishes an optimum route to the intersection. The method and apparatus creates a virtual zero-length dummy link, connects one end of the virtual zero-length dummy link to all link-spot pairs indicating an original intersection destination, sets another end of the virtual zero-length dummy link as a temporary destination, calculates possible routes between the temporary destination and a current vehicle position and selects the optimum route. After determining the optimum route, the navigation system removes the virtual zero-length dummy link and starts the route guidance operation to the intersection destination.

10 Claims, 16 Drawing Sheets

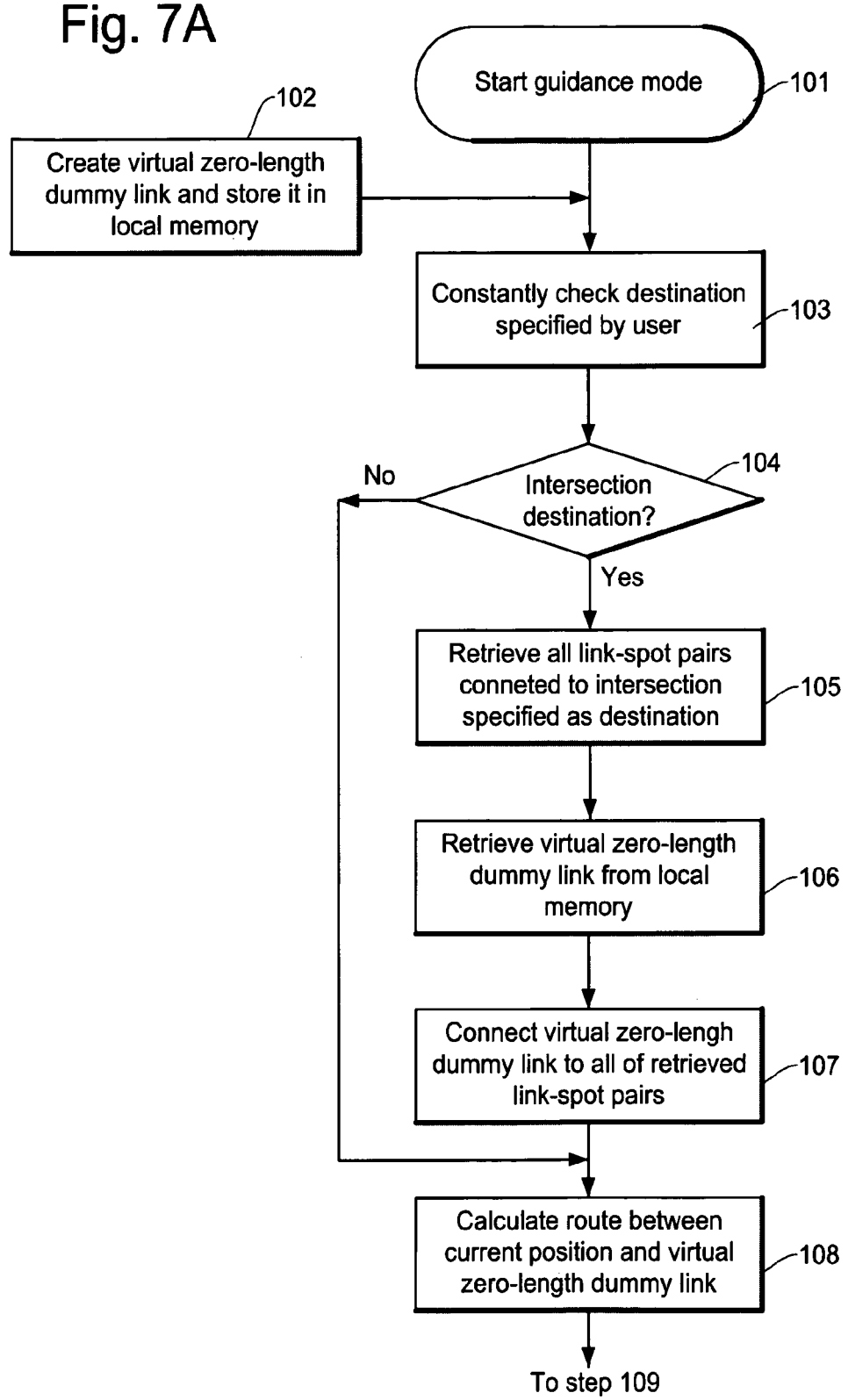

METHOD AND APPARATUS FOR ESTABLISHING OPTIMUM ROUTE TO INTERSECTION DESTINATION FOR NAVIGATION SYSTEM

FIELD OF THE INVENTION

This invention relates to a method and apparatus for a navigation system to determine a route to a destination, and more particularly, to a method and apparatus for a navigation system for establishing the most preferable calculated route to a destination when such a destination is an intersection by attaching a dummy link of zero-length to the intersection destination.

BACKGROUND OF THE INVENTION

A navigation system performs travel guidance for enabling a user to easily and quickly reach the selected destination. A typical example is a vehicle navigation system where a vehicle is equipped with a navigation function to guide a user to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc, or from a remote data server.

Typically, the navigation system displays a map image on a monitor screen while superimposing thereon, in a highlighted manner, a calculated route to the destination and a mark representing the current vehicle position. When the vehicle moves toward the specified destination, the current vehicle position changes on the calculated route. At a cross section, if a turn is necessary, the navigation system notifies the user which direction to turn at the intersection by an arrow image on the monitor screen as well as by a voice instruction.

The navigation is designed to establish a preferable route to a specified destination such as a shortest route, a quickest route, etc. for a route guidance operation. The user is able to specify a destination through various input methods of the navigation system. As is known in the art, one of the input methods for specifying a destination is an "Intersection" method.

In this method, a user is able to specify an intersection as a destination by inputting two cross streets in the navigation system. For instance, an intersection formed by "Irvine Center Drive" and "Jeffery Street" can be a destination where the user inputs the names of these two streets. In calculating a route to such an intersection, however, in some cases, a navigation system of today may fail to create an optimum calculated route.

FIGS. 1A-1B are schematic diagrams showing an example of such a situation where an intersection 11 is selected as a destination through the "Intersection" method noted above to reach there from a current position 18. In the example of FIG. 1A, the intersection 11 is formed by streets 15, 17, 19, and 20 where each of the streets 19 and 20 is a one-way street as indicated by arrows 21A and 21B, respectively. The streets 15 and 17 are normal streets where vehicles can travel in two ways.

The schematic view of FIG. 1B shows a route 13A that is a calculated route created by the navigation system for the route guidance between the current position 18 and the intersection destination 11. As seen from FIG. 1B, the calculated route 13A includes road segments A-D, and it is clear that it is not an ideal route. This is because the calculated route 13A takes the road segment A, then makes a left turn to take the road segment B, then to the road segments C and D to reach the intersection destination 11 which is obviously an undesirable detour.

In the situation of FIG. 1A, a better route would be a simple straight line from the current position 18 to the intersection destination 11 via the street 17 as shown in FIG. 1C. The calculated route 13B in FIG. 1C is a straight line between the current position 18 and the intersection destination 11 with the shortest distance. In contrast, the calculated route 13A in FIG. 1B makes a left turn, and two right turns to reach the intersection destination 11 which is inefficient and redundant.

FIGS. 2A-2C show another example of situation where the navigation system may create a calculated route to an intersection destination which is an inefficient and redundant route. In the example of FIGS. 2A-2C, an intersection destination 31 is a cross point of a street 35 and a street 37. It is assumed that the navigation system calculates a route between a current vehicle position 38 and the intersection destination 31.

In the example of FIG. 2B, the navigation system has created a calculated route 23A which includes road segments A-D between the current vehicle position 38 and the intersection destination 31. The calculated route 23A will pass the intersection destination 31 via the road segment A on the route 23A. The calculated route 23A then makes a right turn to the road segment B, and makes still another right turn to the road segment C, and finally makes a right turn to the road segment D to reach the intersection destination 31. Clearly, the route 23A is inefficient and a route 23B in FIG. 2C is a desirable route.

Such an inappropriate route may be created because of the structure of the map data currently available in the market in which an intersection is defined by a plurality of road segments (link-spot pairs) each being a one way road. As known in the art, a street in the map data used in the navigation system is defined by a plurality of road segments of links. The road segments are connected with one another at a spot (node) where the spot (geometric point data) specifies the absolute location of the connection point of the two road segments.

When an intersection is a destination, because of the structure of the map data and the route calculation process, the navigation system may fail to produce the most preferable route as described in detail later. Thus, it is desired to overcome the shortcomings in the conventional technology described above to obtain more efficient routes without changing the contents of the map data.

SUMMARY OF THE INVENTION

It is, therefore, an object of the present invention to provide a method and apparatus for a navigation system which is capable of obtaining the most preferable route to a destination for a route guidance operation when the destination is an intersection.

It is another object of the present invention to provide a method and apparatus for a navigation system which is capable of obtaining the most preferable route to the intersection destination by attaching a dummy link of zero-length to the intersection when calculating a route.

It is a further object of the present invention to provide a method and apparatus for a navigation system which is capable of obtaining the most preferable route to the intersection destination by attaching a dummy link of zero-length so as to calculate a route to the dummy link rather than to the original intersection.

It is a further object of the present invention to provide a method and apparatus for a navigation system which is capable of obtaining the most preferable route to the intersection destination by attaching a dummy link of zero-length and examining a plurality of road segments indicating the original intersection that lead to the dummy link for selecting the most preferable route.

One aspect of the present invention is a route calculating method for a navigation system. The route calculating method includes the steps of: creating data indicating a virtual zero-length dummy link and storing the data in a memory of the navigation system; retrieving the data indicating the virtual zero-length dummy link when a specified destination is an intersection (intersection destination); connecting one end of the virtual zero-length dummy link to the intersection destination and setting another end of said virtual zero-length dummy link as a temporary destination; calculating possible routes between the temporary destination and a current position of a user; and selecting a most preferable route to the temporary destination for a route guidance operation to the intersection destination.

The method of the present invention further includes a step of retrieving all map data from a map database of the navigation system that are necessary for calculating the possible routes between the destination and the current position of the user. The method of the present invention further includes a step of retrieving all link-spot pairs that indicate the intersection destination from the map database of the navigation system.

In the method of the present invention, the step of connecting the end of the virtual zero-length dummy link to the intersection destination further includes a step of connecting the end of the virtual zero-length dummy link to all of the link-spot pairs that indicate the intersection destination. In the method of the present invention, the step of selecting the most preferable route to the temporary destination includes a step of selecting the preferable route that includes one of the link-spot pairs indicating the intersection destination of least cost.

The method of the present invention further includes a step of removing the virtual zero-length dummy link from the intersection destination after the step of selecting the most preferable route to the temporary destination. The method of the present invention further includes a step of replacing the temporary destination with the intersection destination. The method of the present invention further includes a step of starting the route guidance operation to the intersection destination through the selected route.

In the present invention, the virtual zero-length dummy link is a single link of no length that is used solely in a process of calculating a route to a destination when the destination is an intersection. Further, the data indicating the virtual zero-length dummy link differs from the map data indicating link-spot pairs in that it lacks information on absolute positions and attributes.

Another aspect of the present invention is an apparatus for a navigation system to obtain an optimum route to a destination when the destination specified by the user is an intersection by implementing the various steps of the route calculation method described above. The apparatus of the present invention incorporates a dummy link of zero-length to the intersection destination so as to produce possible routes to the dummy link. The apparatus eventually selects one of intersection links (link-spot pairs indicating the intersection) that is best suited for the route to the intersection, thereby obtaining the most preferable calculated route to the intersection destination.

According to the present invention, the navigation system creates and stores the virtual zero-length dummy link which will be added to the map data (intersection links) associated with a specified intersection when calculating a route to the intersection. Namely, the navigation system is capable of obtaining the most preferable route to the destination for a route guidance operation when the destination is an intersection. In the present invention, the navigation system obtains the most preferable route to the intersection destination by attaching the virtual zero-length dummy link to the intersection so as to calculate a route to the dummy link rather than to the original intersection. After attaching the virtual zero-length dummy link to the intersection destination, the navigation system examines a plurality of road segments (link-spot pairs) indicating the original intersection that lead to the dummy link for selecting the most preferable route. In other words, by temporally interpreting that the location of the end node of the dummy link as a final location of the intersection destination, the navigation system is able to produce the most accurate and efficient calculated route to the intersection destination.

BRIEF DESCRIPTION OF THE DRAWINGS

FIG. 3A shows a link-spot relationship in the map data indicating a non-intersection destination and FIG. 3B shows a link-spot relationship in the map data indicating an intersection destination.

FIG. 4A shows an intersection destination and a current position, FIG. 4B shows an enlarged view of four road segments in the map data indicating the intersection destination, FIGS. 4C and 4D show the situation where one of the road segments indicating the intersection destination is selected for the calculated route, FIG. 4E shows an example of inappropriate calculated route to the intersection destination because of selecting the road segment in FIGS. 4C and 4D, and FIG. 4F shows an appropriate calculated route that should have been established.

FIG. 5A shows an example of structure of a virtual zero-length dummy link having end nodes and a link, and FIG. 5B shows a situation where the node of the virtual zero-length dummy link is attached to the intersection destination.

FIG. 6A shows a situation where the virtual zero-length dummy link is attached to the intersection destination, FIG. 6B shows an enlarged view of the map data having four road segments indicating the intersection destination where the virtual zero-length dummy link is attached thereto, FIGS. 6C-6D show a process of obtaining other routes in which each road segment of the intersection is examined to select the best road segment, FIG. 6E shows the best calculated route to the end node of the virtual zero-length dummy link, and FIG. 6F shows an actual calculated route which is basically the same as that of FIG. 6E because the virtual zero-length dummy link has no length.

FIGS. 7A and 7B are flow charts showing an example of operational steps for calculating a route using the virtual zero-length dummy link for the intersection destination under the present invention where FIG. 7A shows a first half of the process of the invention and FIG. 7B shows the last half of the process of the invention.

DETAILED DESCRIPTION OF THE PREFERRED EMBODIMENT

The method and apparatus of the present invention for creating an accurate and efficient calculated route to a destination when the destination is an intersection is described in detail with reference to the accompanying drawings. The present invention is designed to provide the process and structure for establishing a calculated route to the intersection destination by attaching a dummy link of zero-length to the intersection destination. By attaching the virtual zero-length dummy link to the map data indicating the intersection destination, the navigation system is able to find the best route to an end node of the dummy link while selecting the most appropriate road segment (intersection link of link-spot pair) indicating the intersection leading to the dummy link.

When the user selects a destination through an input method of "Intersection", for example, by specifying two cross streets, the navigation system activates the route calculation method of the present invention. The navigation system attaches the virtual zero-length dummy link to the intersection destination where the dummy link has a substantially zero length but has dummy spot locations (start node and end node).

By interpreting that the location of the end node of the dummy link as a final location of the intersection destination, the navigation system is able to produce an accurate and efficient calculated route to the intersection as will be described in detail later. In other words, since the spots of the intersection links in the map data (FIG. 3B) are not the final location of the destination, the calculated route can be created without involving the problems associated with the conventional technology. The end node of the virtual zero-length dummy link is used as a temporary destination for the sole purpose of calculating a route. After determining the optimum route, the navigation system removes the virtual zero-length dummy link from the intersection and starts the route guidance operation.

Thus, the method and apparatus of the present invention enables to provide a flexible, convenient and quick way to create an accurate and efficient route to the intersection destination through the navigation system. The user is able to reach the destination quickly without making unnecessary turns or detours. It should be noted that the present invention is described mainly for the case where the method and apparatus is applied to a vehicle navigation system, however, the method and apparatus under the present invention can be implemented to other devices, such as portable devices or personal computers, etc.

Figure 1A:
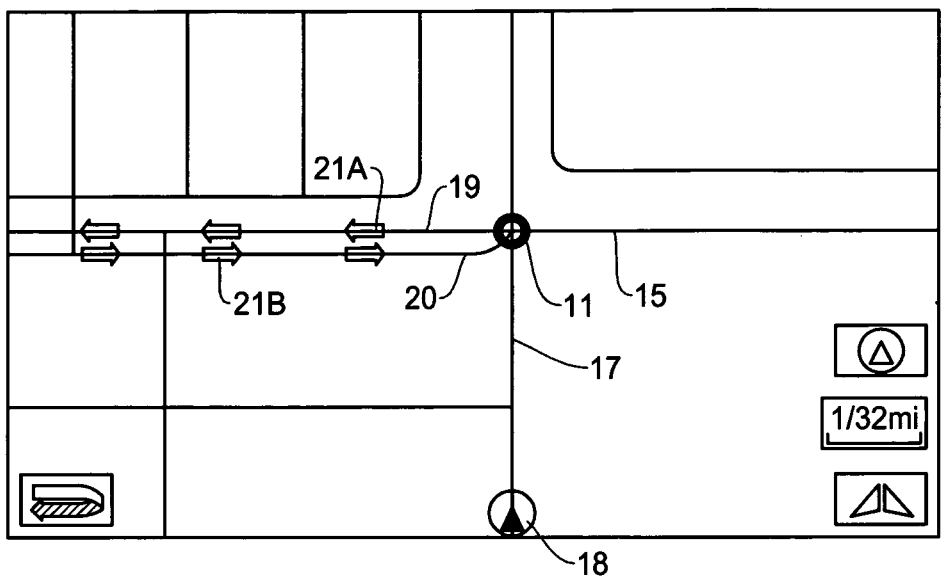
FIGS. 1A-1C are schematic diagrams showing a situation where a problem may arise in the conventional technology in calculating a route to a destination when the destination is an intersection.
Figure 1B:
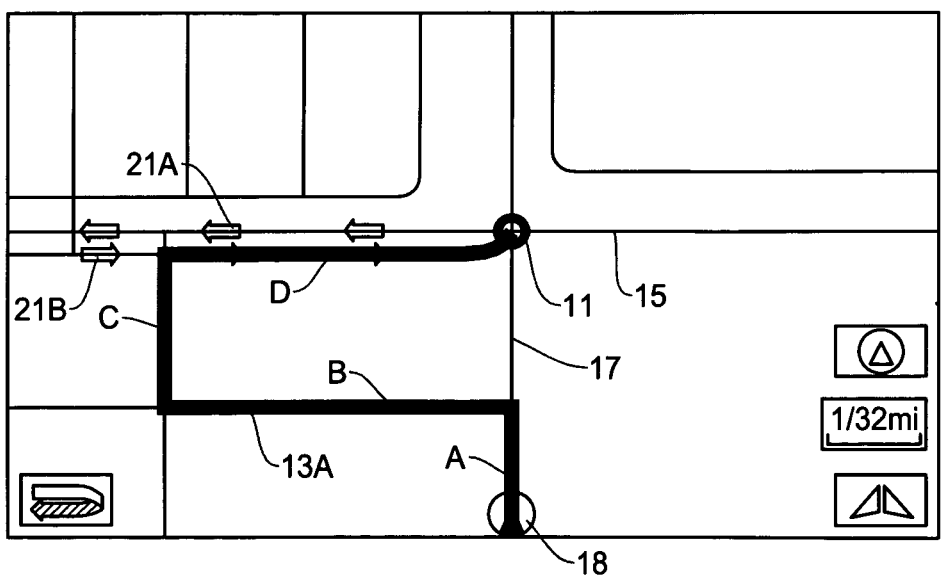
Figure 1C:
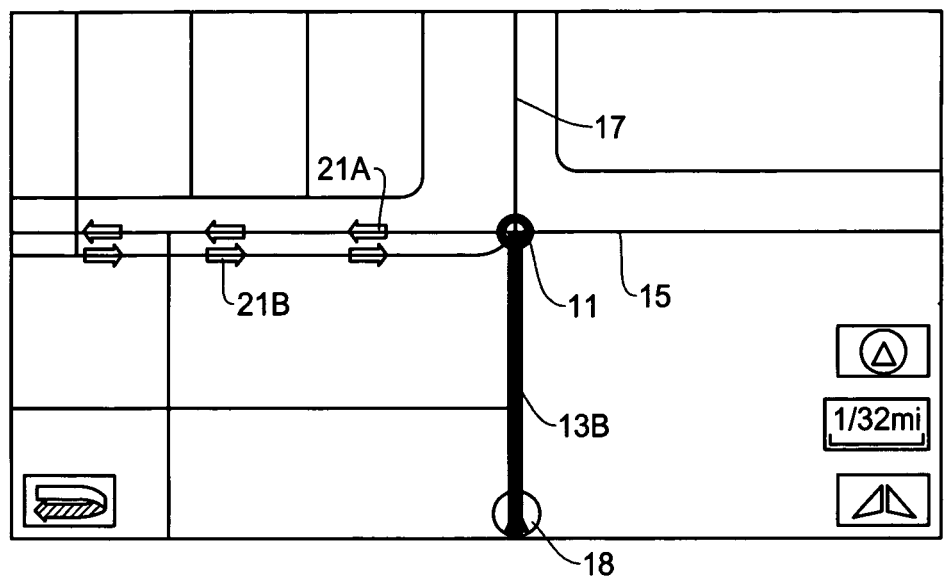
Figure 2A:
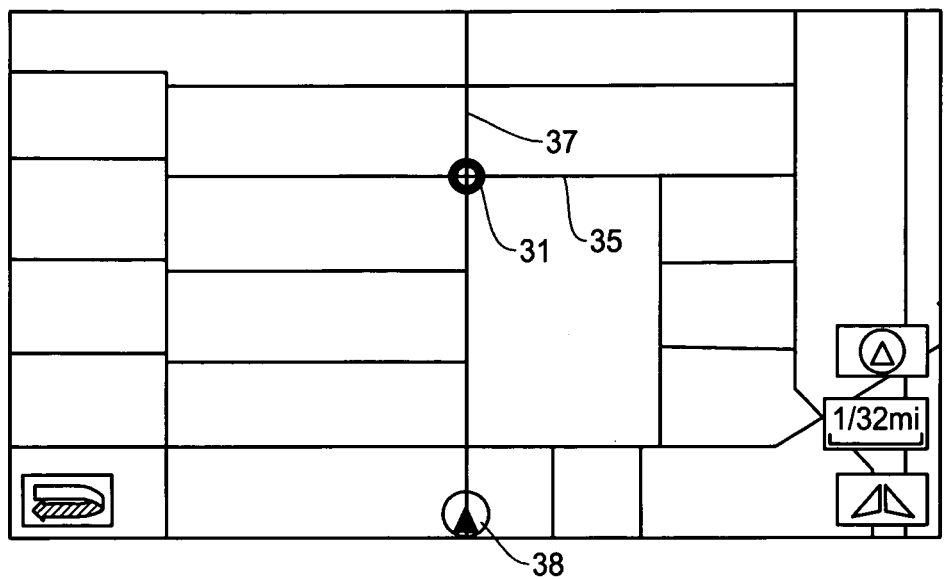
FIGS. 2A-2C are schematic diagrams showing another situation where a problem may arise in the conventional technology in calculating a route to a destination when the destination is an intersection.
Figure 2B:
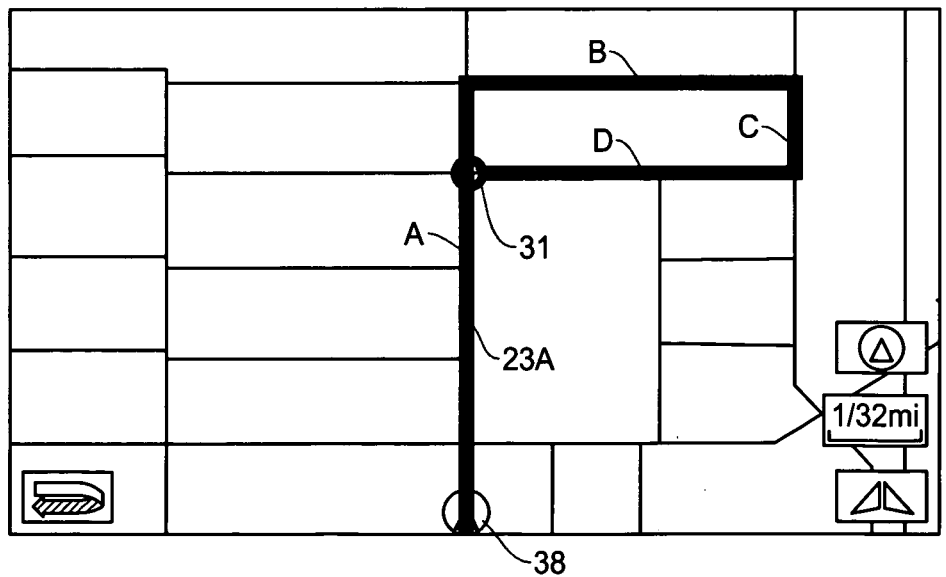
Figure 2C:
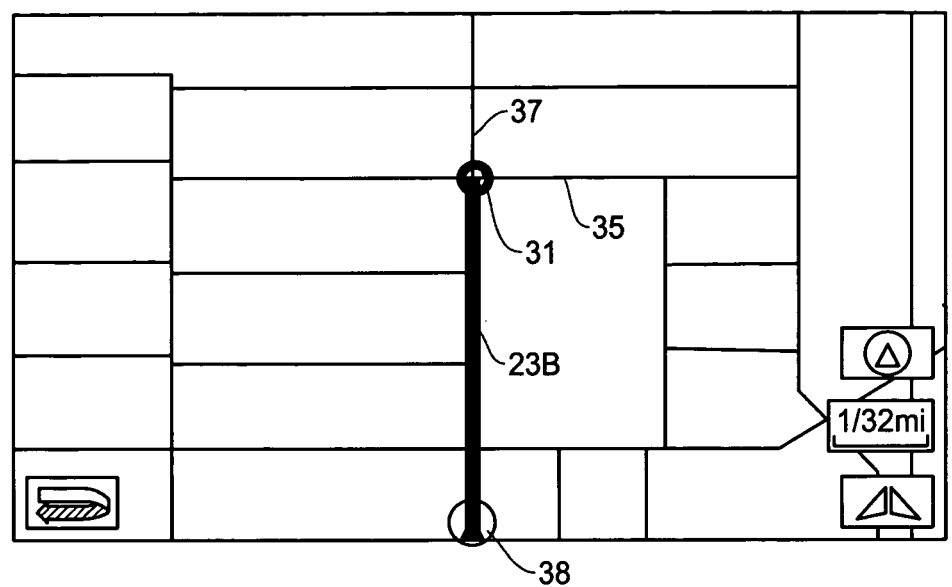
Figure 3A:
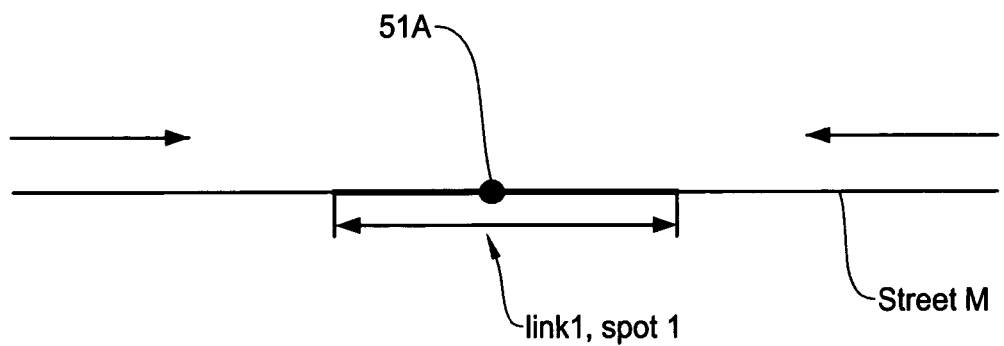
FIGS. 3A and 3B are schematic diagrams showing images of road segments or links in the map data incorporated in today's navigation systems where
Figure 3B:
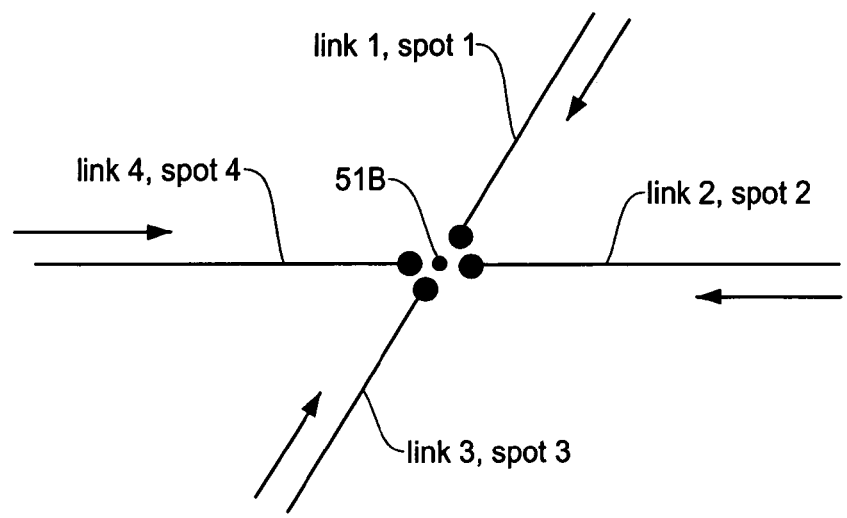

To facilitate a better understanding of the present invention, the cause of the problems associated with the conventional technology is described below. FIGS. 3A and 3B are schematic diagrams showing images of data structure indicating road segments or links in the map data used in today's navigation systems. FIG. 3A shows a link-spot relationship for a non-intersection destination, and FIG. 3B shows a link-spot relationship for an intersection destination. Thus, FIGS. 3A and 3B show the difference related to the route calculation procedure and associated map data conditions between the intersection destination and the non-intersection destination.

In the route calculation procedure of the navigation system using the map data available in the market today, a destination is represented by a link and a spot. The link and spot is also referred to as a road segment that is identified by a unique reference name or number. As noted above, in the map data, a street is defined by a plurality of road segments (links and spots) connected with one another. The spot is geometric point data showing an absolute location (described by latitude and longitude data) on the link typically indicating a connection point on the link (road segments). Typically, the link and the spot are paired together in the map data, which is hereafter referred to as a "link-spot pair".

Referring to FIG. 3A that shows the schematic representation of a non-intersection destination, there is only one link-spot pair (link 1, spot 1) that indicates the destination on a street. The link-spot pair of FIG. 3A is used for determining a route to a destination 51A on a street M, since the destination 51A is on the link 1. In the example of FIG. 3A, the link 1 is configured by two road segments connected at the spot 1.

In this example, the spot 1 of the link 1 is also the destination 51A for the simplicity of explanation. In a practical use of the navigation system, a destination may not be on the same point of the spot but rather on somewhere between two spots. As is known in the art, in a case where a destination is not exactly on a spot of a link, an interpolation method may be used to determined the actual position of the destination by proportionally dividing, for example, two spot locations on road segments.

In the case of a one-way link, which represents a one-way street, the route to the destination is directed from only one side of the link. If the link is not a one-way link, the route to the destination can be directed from either side of the link as indicated by the arrows that run along the street M in FIG. 3A in opposite directions. Thus, depending on the current position of the user (vehicle), an appropriate route to the destination 51A can be determined with one of the directions of the link 1. Thus, an appropriate calculated route will be created without error or problem.

In contrast, with respect to an intersection 51B as a destination, in the map data currently used in many navigation systems, a plurality of link-spot pairs as shown in the schematic view of FIG. 3B are included all of which indicate the intersection 51B. As shown, toward the intersection 51B, links (road segments) 1, 2, 3, and 4 are involved for indicating possible routes to the intersection 51B. That is, in this example, there are four link-spot pairs, link 1-spot 1, link 2-spot 2, link 3-spot 3, and link 4-spot 4 where the data of the absolute locations of the spots 1-4 may or may not be the same.

As shown, in the case of intersection, each spot is at the end of the corresponding intersection link, i.e., it indicates the location of the intended intersection. Namely, with respect to an intersection, typically, four link-spot pairs are involved, and each of all the link-spot pairs is the final link-spot pair to reach the intersection destination. Each link-spot pair allows only one direction to reach the location of the spot (intersection destination), and all of the link-spot pairs of FIG. 3B are considered valid under the conventional navigation system. Consequently, depending on which link-spot pair is selected for the calculation of the route, an inappropriate calculated route can be produced by the navigation system because the final link to the destination is always treated as a correct one.

Namely, the navigation system will generate an inappropriate route to reach the intersection because it is not designed to create the routes involving all the link-spot pairs if such link-spot pairs are the last ones to reach the destination. FIGS. 4A to 4F are schematic diagrams showing an example of street connections and the process of calculating a route to a destination when the destination is an intersection. In other words, the example of FIGS. 4A to 4D show an example as to how an inappropriate calculated route can be generated due to the data representation of an intersection destination in the current map data and the calculation process by the conventional navigation system.

Figure 4A:
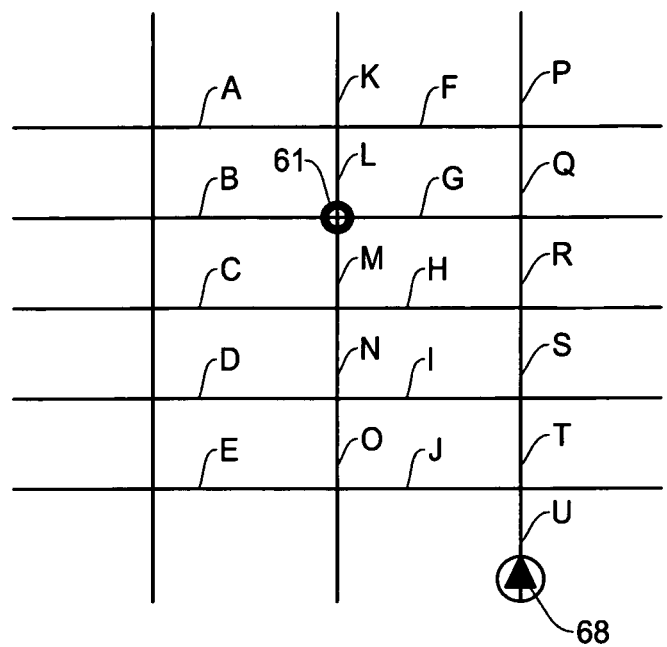
FIGS. 4A-4F are schematic diagrams showing an example of process for producing a calculated route where an inappropriate route can be generated due to the data representation of an intersection destination in the current map database where
Figure 4B:
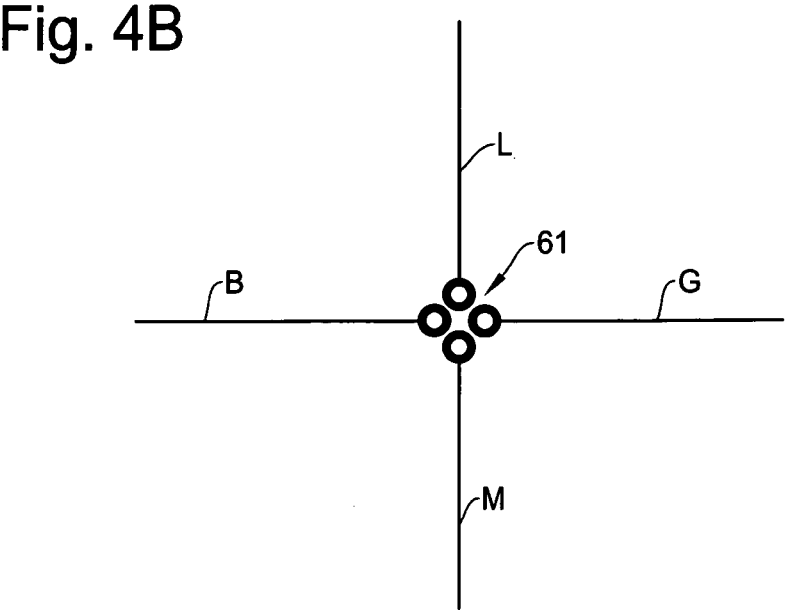

In the map image of FIGS. 4A-4F, it is assumed that a user is operating the navigation system at a vehicle position 68 to reach an intersection destination 61. Road segments (link-spot pairs) involved in this example are indicated by alphabetical characters A to U. As noted with reference to FIG. 3B and as shown in FIG. 4B, the typical map data used in navigation systems includes a plurality of possible link-spot pairs that finally reach the intersection destination 61. Namely, as shown in FIG. 4B, the map data includes four final road segments (link-spot pairs) B, L, G and M indicating the intersection where each spot of the link-spot pair independently indicates the location of the intersection destination 61.

Accordingly, all of the road segments (link-spot pairs) B, L, G and M are considered valid to reach the intersection destination 61. As shown in FIG. 4B, each of the four link-spot pairs (road segments) is a one-way link where its spot is at its end indicating the intersection destination 61. Since the spot of each of the link-spot pairs identifies the location of the intersection destination 61 and its link is one-way, the traditional navigation system judges that all of the link-spot pairs are valid in calculating the route to the destination as noted above.

Figure 4C:
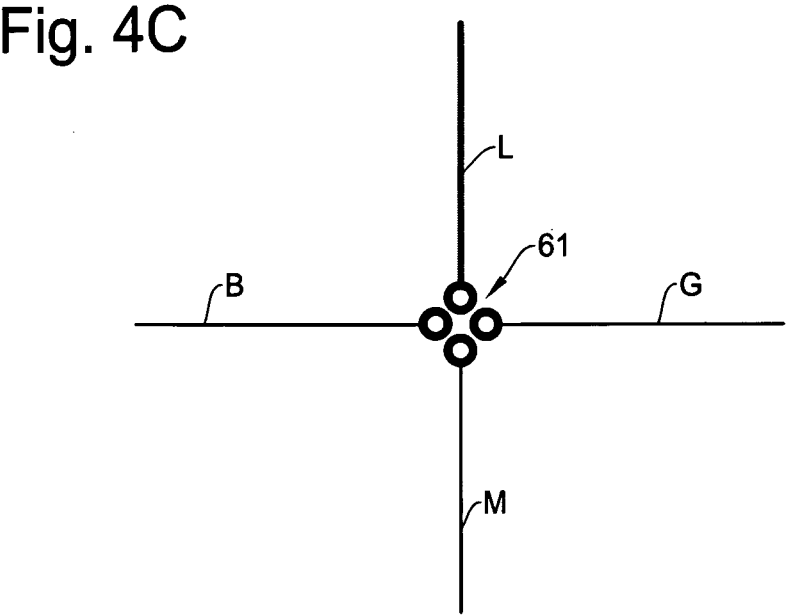
Figure 4D:
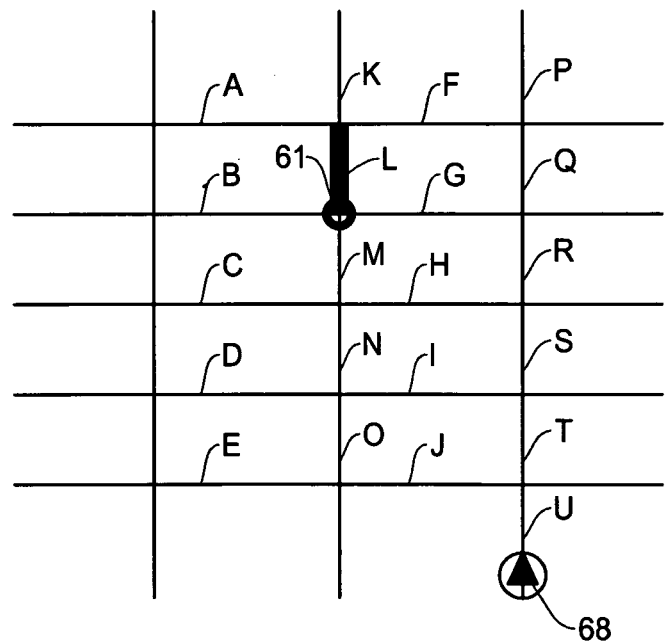

FIG. 4C shows a condition where the link-spot pair (road segment) L is selected in calculating the route to the destination. Once the link-spot pair (road segment) L has been selected, the navigation system will establish a calculated route to the intersection destination 61 by incorporating the link-spot pair L as the last link in the calculated route in the manner as shown in FIG. 4D. This is because the link-spot pair L is accidentally selected in the calculating process of FIG. 4C while this link-spot pair L is considered valid because it is the last link-spot pair to the destination.

Figure 4E:
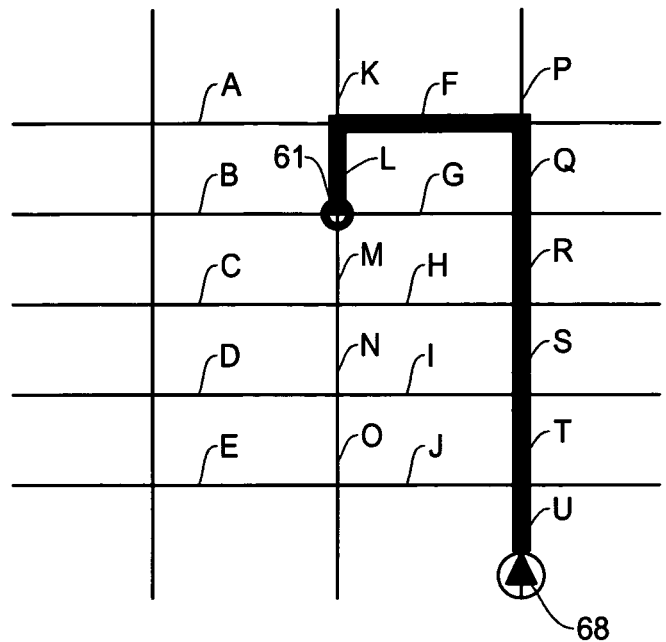
Figure 4F:
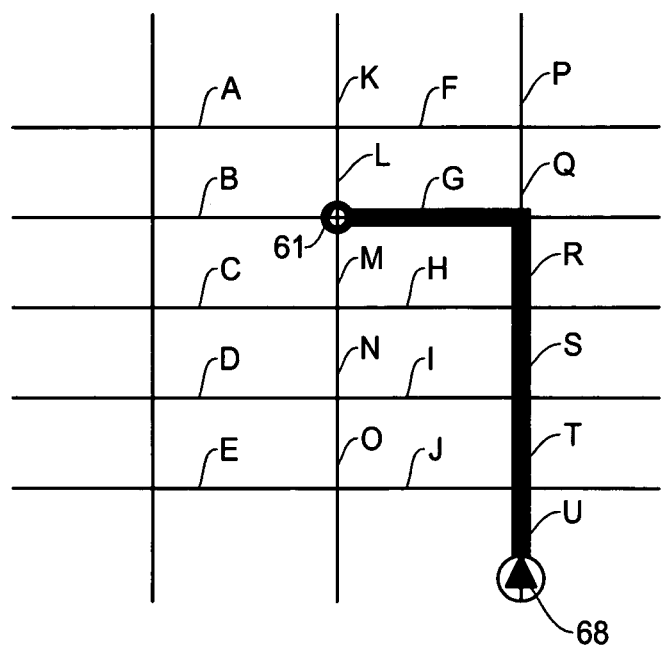

Thus, in the example of FIG. 4E, the resultant calculated route between the current position 68 and the intersection destination 61 is formed by connecting the road segments L, F, Q, R, S, T and U. It is apparent that the route of FIG. 4E is inappropriate by making an unnecessary detour which includes the road segments L, F and Q. In contrast, the route shown in FIG. 4F is more preferable because it utilizes the road segment G rather than the road segments L, F and Q, thereby making the overall route much shorter than that of FIG. 4E. The route shown in FIG. 4E is resulted due to the initial selection of the link-spot pair L in the process of FIG. 4C.

In the present invention, the problems and shortcomings described above are resolved by incorporating a virtual zero-length dummy link. The virtual zero-length dummy link is a link that has a length of zero or almost zero and is added to the link-spot pairs that indicate an intersection destination as a destination (final link to the destination) for only a route calculation purpose. Thus, instead of the link-spot pairs 1-4 in FIG. 3B or the link-spot pairs B,L,G, M in FIG. 4B, an end node of the virtual zero-length dummy link is now used for calculating the route to an intersection destination.

Namely, the virtual zero-length dummy link rather than the link-spot pairs B, L, G, and M in FIGS. 4A-4D now represents the final (temporary) intersection destination for the purpose of calculating the route to the intersection destination. In this arrangement, the navigation system operates to minimize the cost of reaching the virtual zero-length dummy link by evaluating the link-spot pairs B, L, G, M in FIGS. 4A-4D in the route calculation. The navigation system selects one of the link-spot pairs (link-spot pair G in FIG. 4F) to produce the most preferable route.

In the present invention, the virtual zero-length dummy link is now considered to be the last and valid link representing the destination. Thus, the most appropriate link-spot pair is selected from the link-spot pairs B, L, M, and G in FIGS. 4B and 4C to reach the virtual zero-length dummy link. As a result, the navigation system will establish the calculated route that connects between the current position 68 and the virtual zero-length dummy link (intersection destination 61) in the manner shown in FIG. 4F by selecting the best link-spot pair G.

Figure 5A:
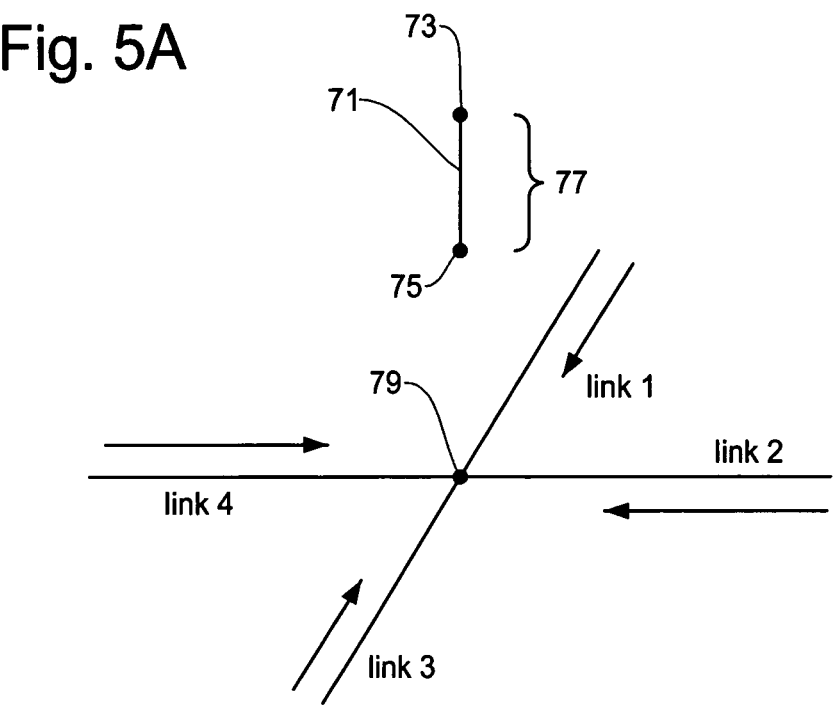
FIGS. 5A and 5B are schematic diagrams showing a basic concept of the present invention where a virtual zero-length dummy link is attached to the intersection destination where

FIG. 5A is a schematic view showing a virtual zero-length dummy link 77 which is comprised of a link 71 and end nodes 73, 75. Although abbreviated, an intersection destination 79 is located at the end of the link-spot pairs (road segments) 1, 2, 3, and 4 as a manner shown in FIG. 3B of FIG. 4B. The navigation system will attach one end of the virtual zero-length dummy link 77, in this example, the end node 75, to the intersection destination 79.

Figure 5B:
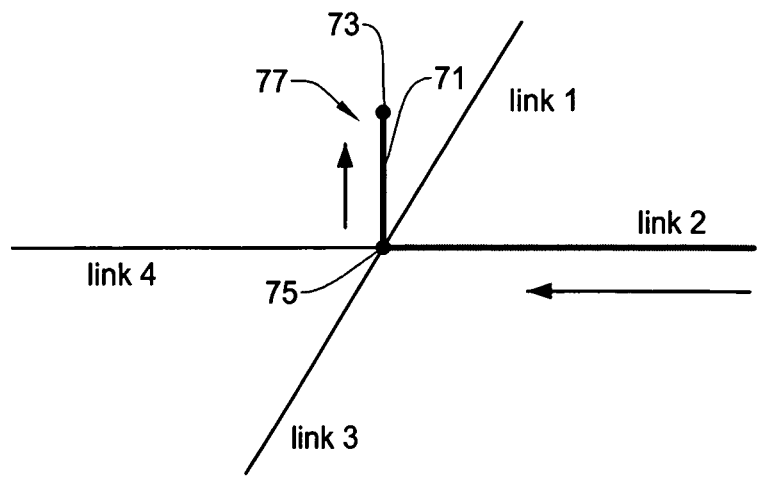

FIG. 5B shows a situation where the end node 75 of the virtual zero-length dummy link 77 is attached to the intersection destination 79. The other end node 73 is not connected to any other link, thereby representing a virtual intersection destination. Thus, during the route calculation, the navigation system treats the virtual zero-length dummy link 77 as the destination link where the node 73 is a final destination point.

Depending on the current vehicle position, the navigation system checks various routes and establishes the most appropriate calculated route to the destination point (end node 73) at the end of the virtual zero-length dummy link 77. The navigation system seeks the most efficient route to the node 73 via the original intersection destination 79 (i.e., one of the link-spot pairs 1-4). Since the length of the virtual zero-length dummy link 77 is zero or substantially zero, the end node 73 (temporary destination) and the original intersection destination 79 are in effect located at the same geographic position (same longitude/altitude).

That is, the cost associated with taking the virtual zero-length dummy link 77 is kept minimum which enables to choose the most appropriate intersection link out of the link-spot pairs 1-4. Since it has no actual length, the addition of the virtual zero-length dummy link 77 will not affect the geographic location between the real destination 79 and the destination point (end node 73) on the virtual zero-length dummy link 77. In the present invention, in contrast to the previous example where all of the link-spot pairs 1, 2, 3, and 4 in FIGS. 3 or the link-spot pairs B, L, G, M in FIGS. 4B can be a valid candidate link, there is only one valid link-spot pair, i.e., the virtual zero-length dummy link 77, that represents the intersection destination 79.

FIGS. 6A-6F are schematic diagrams similar to that of FIGS. 4A-4F except that the example of FIGS. 6A-6F is directed to the case where the virtual zero-length dummy link in the present invention is used to calculate a route to an intersection destination. Namely, FIGS. 6A-6F show an example of process for calculating a route incorporating the virtual zero-length dummy link that is attached to the intersection destination to obtain the best calculated route to the destination. As noted above, the virtual zero-length dummy link is a link of zero-length added to the original intersection destination to calculate a route as though the end node of the virtual zero-length dummy link is a final location of the destination.

Figure 6A:
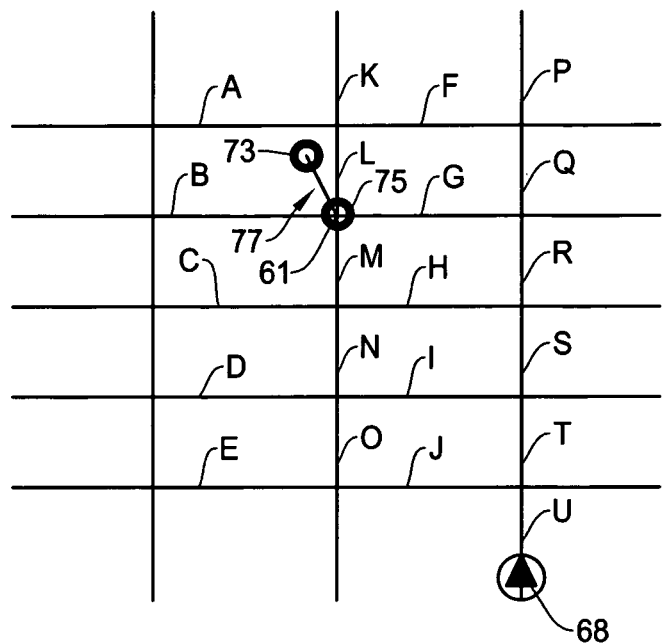
FIGS. 6A-6F are schematic diagrams showing an example of process for calculating a route incorporating the virtual zero-length dummy link for the intersection destination to obtain the best calculated route to the destination where

FIG. 6A shows a map image identical to that of FIGS. 4A-4F, however, the virtual zero-length dummy link 77 is attached to the intersection destination 61. The virtual zero-length dummy link 77 has an end node 75 which is connected to all of the link-spot pairs B, L, M and G each indicating the original intersection destination 61. Under the present invention, the navigation system treats the end node 73 of the virtual zero-length dummy link 77 as a destination for the purpose of route calculation.

Figure 6B:
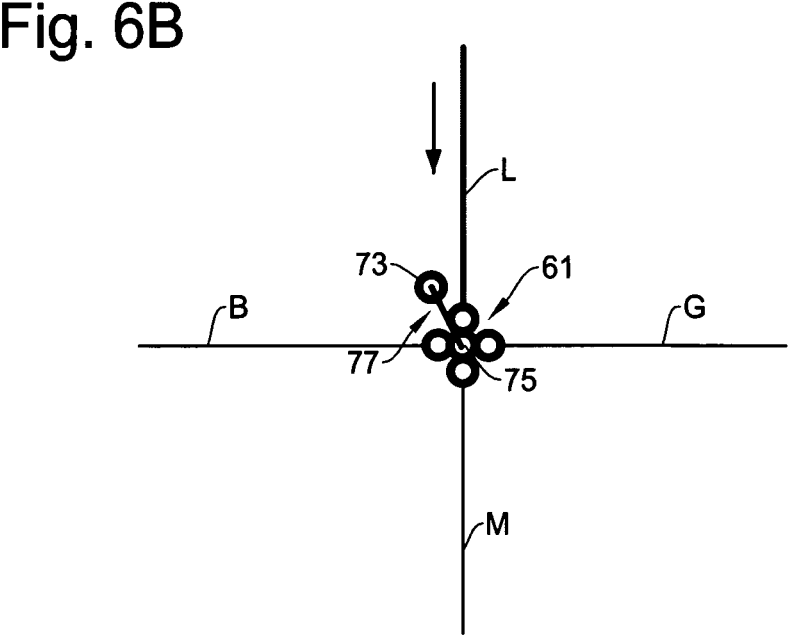

FIG. 6B shows an enlarged image of the map data involving the intersection destination 61 and the virtual zero-length dummy link 77. As noted above, the intersection destination 61 can be expressed by the map data of any one of four road segments (link-spot pairs) B, L, M and G. In the present invention, the end node 73 of the virtual zero-length dummy link 77 rather than one of the link-spot pairs B, L, M and G is the final destination for the purpose of calculating a route.

Figure 6C:
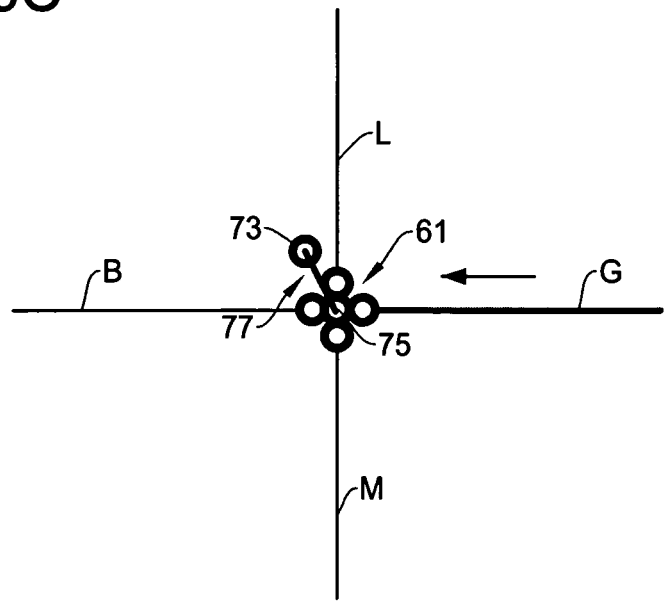
Figure 6D:
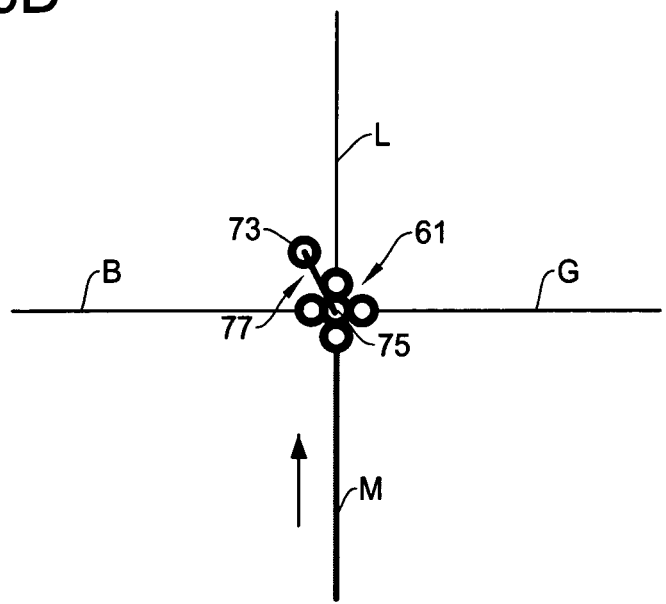

Thus, the navigation system compares various possible routes to establish the best route between the current vehicle position 68 and the end node 73. In the example of FIG. 6B, as indicated by the bold line, the navigation system examines a route involving the link-spot pair L. FIG. 6C shows a process of obtaining another route to the end node 73 via the link-spot pair G, and FIG. 6D shows a process of obtaining a further route to the end node 73 via the link-spot pair M.

Figure 6E:
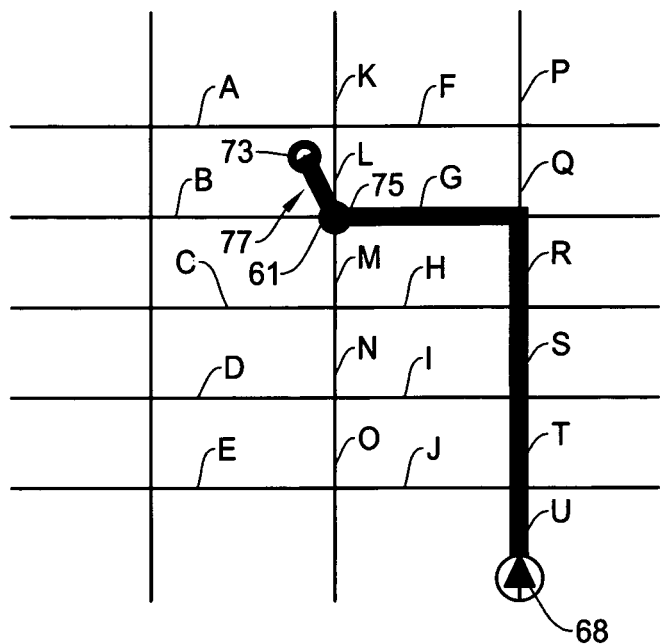

In this manner, the navigation system examines possible ways and obtains the most cost effective route between the current vehicle position 68 and the end node 73 of the virtual zero-length dummy link 77. Consequently, as shown in FIG. 6E, the navigation system will finally produce the most preferable calculated route to the end node 73 of the virtual zero-length dummy link 77 which uses the road segment (link-spot pair) G. As noted above, since the virtual zero-length dummy link 77 has no length, an actual calculated route for the route guidance operation is a route shown in a manner of FIG. 6F.

In the present invention, the virtual zero-length dummy link 77 has the advantage that the process of route calculation does not require much extra computing resources. For example, with respect to the memory usage, the virtual zero-length dummy link 77 would need only around 100 bytes of data since it is a single link, which is negligible as a data size. Moreover, with respect to the computer usage in the route calculation, the virtual zero-length dummy link 77 does not require much computing power since the process adds only one link in the calculation process whereas a normal process for calculating a route involves hundreds or thousands of links. In addition, the route calculation process is simple and easy because the virtual zero-length dummy link 77 is a zero-length link without any absolute position or special attributes (ex. one-way, time restriction, road class, etc).

Figure 8:
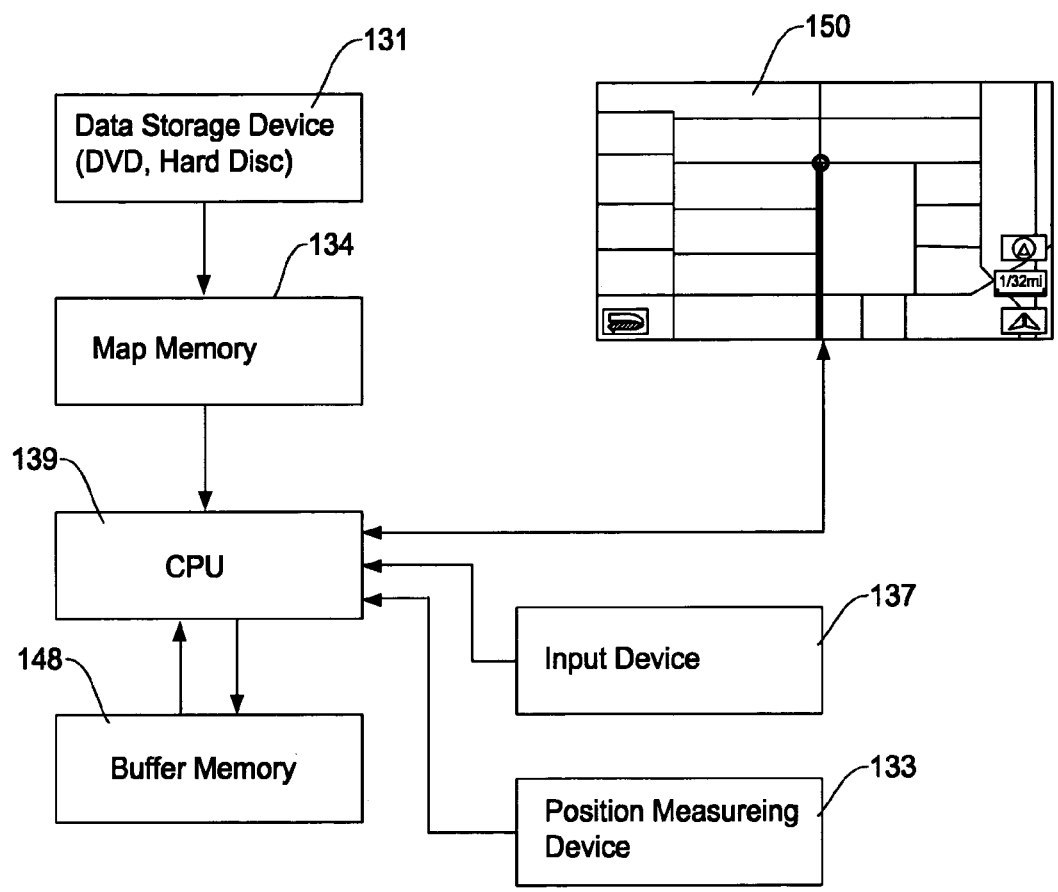
FIG. 8 is a functional block diagram showing an example of basic structure of the apparatus implementing the route calculation method of the present invention when the destination is an intersection.
Figure 9:
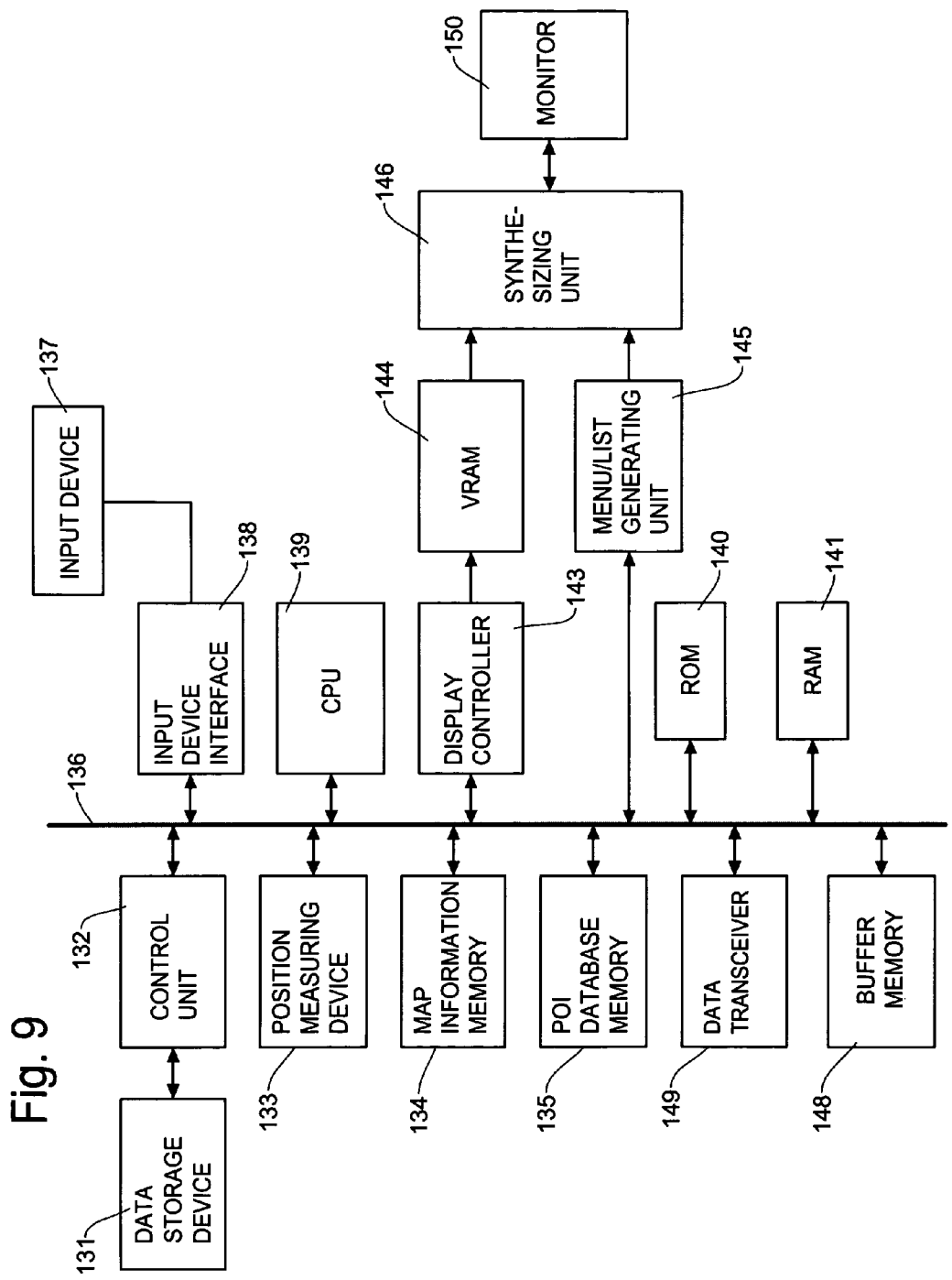
FIG. 9 is a functional block diagram showing an example of structure of a vehicle navigation system implementing the route calculation method of the present invention when the destination is an intersection.

The data concerning the virtual zero-length dummy link 77 can be stored in a local memory such as a buffer memory or a memory in a CPU, etc, in the navigation system (see FIGS. 8 and 9). Thus, it is unnecessary to access the hard disc, DVD or other large data storage device of the navigation system to retrieve the data of the virtual zero-length dummy link 77. In other words, when an intersection is selected as a destination, the navigation system can simply retrieve the virtual zero-length dummy link 77 from the local memory, etc., and add the dummy link 77 to the intersection links (link-spot pairs or road segments indicating the intersection) as described above.

The virtual zero-length dummy link 77 can be processed like a normal link so that it is unnecessary to modify the algorithm to specifically handle the virtual zero-length dummy link 77 in the route calculation. Thus, the present invention can be implemented without significant change or modification in the software or hardware of the navigation system. The extra time required for processing the virtual zero-length dummy link 77 is negligible because of the data size and increase of only one link as noted above. Thus, the processing time to calculate the route in the present invention is not practically affected by incorporating the virtual zero-length dummy link 77.

Figure 7B:
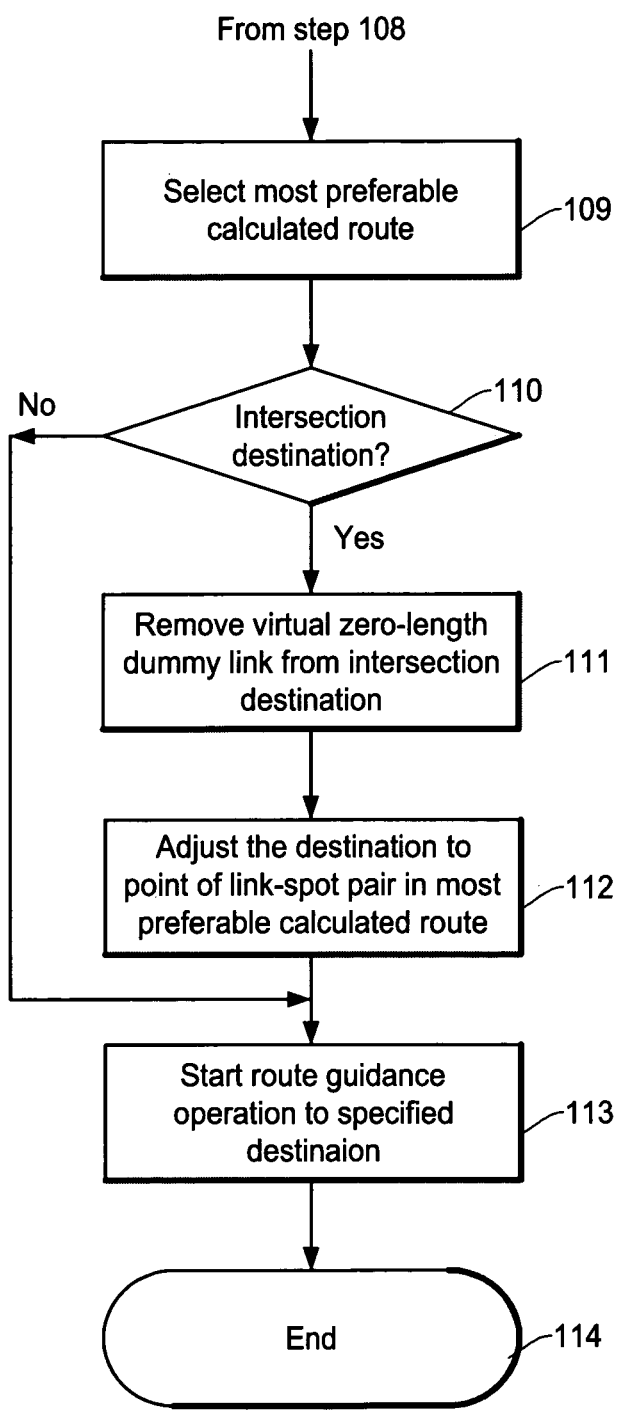

The flow charts of FIGS. 7A and 7B show the steps in the process of implementing the route calculation method under the present invention. As noted above, the route calculation method of the present invention incorporates the virtual zero-length dummy link to obtain the most preferable route when the destination is an intersection. FIG. 7A shows the first part of the process of the present invention and FIG. 7B shows the last part thereof.

Referring to FIG. 7A, when the user sets the navigation system to input a destination, the navigation system starts the route guidance mode at the step 101. In the step 102, the navigation system creates the data showing the virtual zero-length dummy link of FIGS. 5A-5B and 6A-6F and stores the data in a local memory such as a buffer memory, RAM, ROM or a memory of CPU (see FIGS. 8 and 9). Although the step 102 is included in the process of FIG. 7A, once the data is created and stored in the memory, the same data can be repeatedly used for later operations of different intersections. Thus, once the virtual zero-length dummy link is created, the step 102 can be unnecessary in the next time of operation of FIGS. 7A and 7B.

In the route guidance mode, in the step 103, the navigation system constantly checks the destination specified by the user. In the step 104, the navigation system determines whether the destination specified by the user is an intersection. As noted above, an intersection destination is typically specified by identifying two cross streets via the "Intersection" input method of the navigation system. As shown in FIGS. 3B and 4B, such an intersection in the current map data used in the navigation system is defined by a plurality of road segments (link-spot pairs) each being valid for indicating the last link reaching the intersection destination.

If the answer in the step 104 is affirmative ("Yes"), the procedure moves to the step 105 in which the navigation system retrieves all the link-spot pairs (road segments) indicating the intersection in addition to the map data of all links necessary for route calculation in the normal operation. Namely, in the step 105, the navigation system reads out all of the map data of link-spot pairs, each indicating the intersection destination, from the map database (data storage device 131 in FIGS. 8 and 9). On the other hand, if the answer in the step 104 is negative ("No"), i.e., the specified destination is not an intersection, the procedure moves to the step 108 for conducting the conventional route calculation.

As shown in FIGS. 4B, 5B, and 6B, the current map data used in a navigation system typically include a plurality (ex.

four) of link-spot pairs that show the intersection destination. Thus, in the step 105 above, the navigation system retrieves from the map database all of the data showing the link-spot pairs (road segments) 1, 2, 3 and 4 of FIG. 5B or the link-spot pairs (road segments) L, B, M, and G of FIGS. 4B and 6B. In the current map data, all of such link-spot pairs (road segments) are considered valid for indicating the final destination in the route calculation when an intersection is specified as the final destination.

In the step 106, the navigation system retrieves the virtual zero-length dummy link from the local memory. As noted above, the virtual zero-length dummy link is a single link of zero-length used for the purpose of only calculating a route to the intersection destination. Also noted above, the data size of the virtual zero-length dummy link is about 100 bytes which is small and negligible in terms of memory capacity as well as processing time.

In the step 107, the navigation system connects the virtual zero-length dummy link to all the retrieved link-spot pairs at the intersection as shown in FIGS. 5B and 6A-6D. For example, in FIGS. 6A-6D, the virtual zero-length dummy link 77 is connected to the link-spot pairs B, G, L and M at the end node 75. In the example of FIGS. 5A and 5B, the virtual zero-length dummy link 77 is connected to the link-spot pairs 1, 2, 3 and 4.

In the step 108, the navigation system performs the route calculation in the manner of a normal route calculation between the current vehicle position and the end node of the virtual zero-length dummy link 77. Namely, rather than between the current vehicle position and one of the link-spot pair of the intersection, the end node 73 of the virtual zero-length dummy link 77 is deemed as the final destination in the route calculation. The end node 73 of the virtual zero-length dummy link 77 is also a temporary destination because once the route is determined, the dummy link 77 is removed for the route guidance operation as described with respect to the steps 111 and 112.

With reference to FIG. 7B, in the step 109, the navigation system selects the most favorable calculated route out of several possible routes. As noted above, in the vicinity of the intersection 61 in FIGS. 6A-6D, there are four possible ways to reach the node 73 of the virtual zero-length dummy link 77, i.e., via the link-spot pairs B, G, L or M. Thus, in the example of 6A-6F, the navigation system selects the calculated route that utilizes the link-spot pair G which is the shortest route.

The process will then move to the step 110 where the navigation system again checks whether the destination considered in the above procedure was an intersection destination. If the answer is negative in the step 110 ("No"), the procedure will move to the step 113 to start the route guidance operation of the calculated route. If the answer in the step 110 is affirmative ("Yes"), the procedure advances to the step 111 in which the navigation system removes the virtual zero-length dummy link from the link-spot pairs since the optimum route to the destination is now established.

Figure 6F:
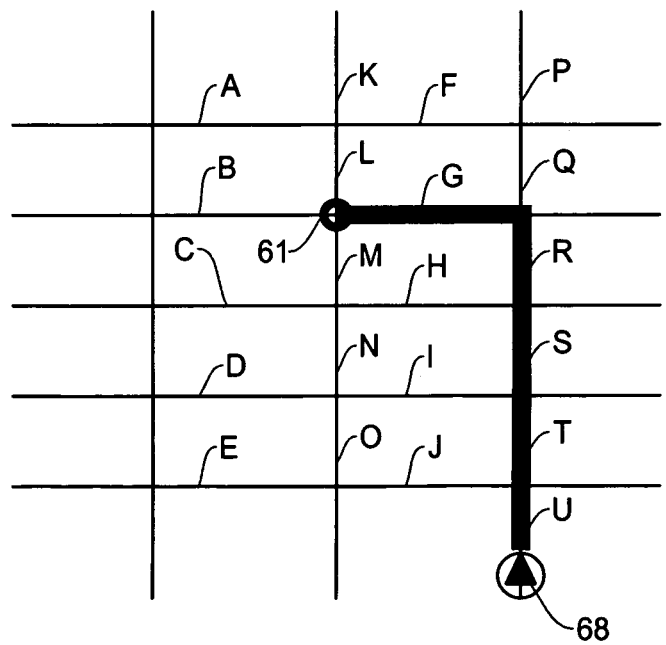

Then, in the step 112, the procedure will adjust the destination point so as to make the end spot of the selected link-spot pair is the actual intersection destination link as shown in FIG. 6F. Namely, in the example of FIGS. 6A-6F, the end spot of the link-spot pair G is now deemed as the actual intersection destination. The steps 111 and 112 noted above are incorporated to conduct the route guidance operation based on information on absolute positions, shapes, sizes, attributes, etc. contained in the actual map data. As noted above, the virtual zero-length dummy link has no such information, thus not applicable to the actual route guidance operation. In the step 113, the navigation system starts the route guidance operation to the specified destination and the process ends in the step 114.

FIG. 8 is a functional block diagram showing an example of basic structure of the apparatus of the present invention for calculating an appropriate route to an intersection destination. The structure of FIG. 8 is applicable to any electronic device having a navigation function which enables the electronic device to guide the user to a particular location as noted above. The apparatus of the present invention includes a monitor 150 for graphical user interface, and a controller (CPU) 139 for controlling an overall operation of the apparatus.

The block diagram of FIG. 8 further includes a data storage device 131 such as a DVD, a hard disc, nonvolatile memory device or any other storage means for storing map data, a map memory 134 for storing a required portion of the map data retrieved from the data storage device 131, an input device 137 such as a joystick, a remote controller, a touch screen or other input device for the user to select menus, change directions, scroll the screen, change the location of the cursor on the screen, etc., a position measuring device 133 for detecting a current position of the user, and a buffer memory 148 for storing data concerning the operation of the navigation system. The buffer memory 148 may also be used as a temporary storage for calculating a route under the present invention.

In FIG. 8, the apparatus for calculating a route to the intersection destination under the present invention is able to retrieve the map data from the data storage device 131 and the map memory 134. Based on the retrieved map data, the apparatus calculates a route to a destination defined by the user or displays the map image on the monitor 150. The CPU 139 controls an overall operation of the route calculation method of the present invention.

Namely, the CPU 139 performs the various operational steps described with reference to the flow charts of FIGS. 7A and 7B. It is assumed that the virtual zero-length dummy link is predefined and stored in a local memory (ex. a buffer memory 148 or a memory in the CPU 139). The CPU 139 determines whether the destination specified by the user is an intersection, and if so, it controls to retrieve all the link-spot pairs (road segments) indicating the intersection in addition to the map data necessary for route calculation in the normal operation.

The CPU 139 retrieves the virtual zero-length dummy link from the local memory and connects it to all the retrieved link-spot pairs at the intersection. Then, the CPU 139 conducts the route calculation between the current vehicle position and the end node of the virtual zero-length dummy link so that the end node of the virtual zero-length dummy link is deemed as the final destination in the route calculation. The CPU 139 selects the most favorable calculated route out of several possible routes where the most favorable route utilizes one of the link-spot pairs associated with the intersection destination.

Once the most preferable route is calculated, the CPU 139 removes the virtual zero-length dummy link from the map data retrieved for the route calculation. The CPU 139 adjusts the destination point so as to make the end spot of the link-spot pair selected in the calculated route is the actual intersection destination link. Then, the apparatus of FIG. 8 starts the route guidance operation to the specified intersection destination via the calculated route obtained in the above procedure.

FIG. 9 shows an example of structure of a vehicle navigation system for implementing the present invention. While the vehicle navigation system is explained for an illustration purpose, the present invention can also be applied to other types of navigation system, such as a portable navigation device, a PDA (personal digital assistant) device implementing a GPS function, other hand-held devices such as a wireless telephone, or a laptop or notebook computer.

In the block diagram, the navigation system includes a data storage device 131 such as a hard disc, CD-ROM, DVD, nonvolatile memory device or any other storage means (hereafter "data disc") for storing the map data and other relevant data used for the navigation system. The navigation system includes a control unit 132 for controlling an operation for reading the information from the data storage device 131, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver which receives and analyzes GPS signals from GPS satellites, and etc.

The block diagram of FIG. 9 further includes a map information memory 134 for storing the map information which is read from the data storage device 131, a database memory 135 for storing database information such as point of interest (POI) information which is read out from the data storage device 131, a input device 137 such as a remote controller for executing a menu selection operation, an enlarge/reduce operation, a destination input operation, etc. and a controller interface 138. Although a remote controller is a typical example for selecting menus, executing selected functions and etc., the navigation system includes various other input methods, such as a touch screen or a voice command, to achieve the same and similar operations done through the remote controller.

In FIG. 9, the navigation system further includes a bus 136 for interfacing the above units in the system, a processor (CPU) 139 for controlling an overall operation of the navigation system, a ROM 140 for storing various control programs such as a route search program and a map matching program necessary for navigation control, a RAM 141 for storing a processing result such as a guide route, a display controller 143 for generating map image (a map guide image and an arrow guide image) on the basis of the map information, a VRAM 144 for storing images generated by the display controller 143, a menu/list generating unit 145 for generating menu image/various list images, a synthesizing unit 146, a data transceiver 149 for receiving data, such as a wireless communication device to retrieve data from a remote server or other wireless devices, such as bluetooth connection. The navigation system further includes a buffer memory 148 for temporally storing data for ease of data processing, and a monitor (display) 150 for displaying menus, keyboards, map images, etc.

A program to detect the intersection destination and create the dummy link and calculate the optimum route described above and shown in the steps in FIGS. 7A and 7B is stored in the ROM 140 or other memory and is executed by the CPU 139. The CPU 139 controls an overall operation of the navigation system including the route calculation method of the present invention. The CPU 139 performs in the manner described above with reference to FIG. 8. The virtual zero-length dummy link is predefined and stored in a local memory such as the buffer memory 148 or a memory in the CPU 139 so that the CPU 139 utilizes the virtual zero-length dummy link when calculating a route to an intersection destination.

As has been described above, according to the present invention, the navigation system creates and stores the virtual zero-length dummy link which will be added to the map data (intersection links) associated with a specified intersection when calculating a route to the intersection. Namely, the navigation system is capable of obtaining the most preferable route to the destination for a route guidance operation when the destination is an intersection. In the present invention, the navigation system obtains the most preferable route to the intersection destination by attaching the virtual zero-length dummy link to the intersection so as to calculate a route to the dummy link rather than to the original intersection. After attaching the virtual zero-length dummy link to the intersection destination, the navigation system examines a plurality of road segments (link-spot pairs) indicating the original intersection that lead to the dummy link for selecting the most preferable route. In other words, by temporarily interpreting that the location of the end node of the dummy link as a final location of the intersection destination, the navigation system is able to produce the most accurate and efficient calculated route to the intersection destination.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A computer-implemented method of calculating a guidance route to a final destination for a navigation system, comprising the steps of
creating data indicating a dummy link and storing the data in a memory of the navigation system;
retrieving the data indicating the dummy link when a specified final destination is an intersection (an intersection destination) where the intersection destination is configured by a plurality of cross streets each being expressed by a link-spot pair in map data of the navigation system;
connecting one end of the dummy link to the intersection destination and setting another end of the dummy link as a temporary destination;
calculating possible routes between the temporary destination and a start point; and
selecting a most preferable route to the temporary destination for a route guidance operation to the intersection destination;
wherein the dummy link is an imaginary link having a substantially zero length created only for a purpose of calculating a guidance route to the intersection destination thereby establishing an optimum guidance route between the start point and the intersection destination that is substantially identical to said most preferable route in which a cross street out of the plurality of cross streets configuring the intersection destination is selected for the optimum guidance route.

2. A method of calculating a route to a destination as defined in claim 1, further comprising a step of retrieving all map data from a map database of the navigation system that are necessary for calculating the possible routes between the destination and the current position of the user.

3. A method of calculating a route to a destination as defined in claim 2, further comprising a step of retrieving all link-spot pairs connected to the intersection destination from the map database of the navigation system.

4. A method of calculating a route to a destination as defined in claim 3, wherein said step of connecting the end of the dummy link to the intersection destination further includes a step of connecting the end of the dummy link to all of the link-spot pairs connected to the intersection destination.

5. A method of calculating a route to a destination as defined in claim 4, wherein said step of selecting the most preferable route to the temporary destination includes a step of selecting the preferable route that includes one of the link-spot pairs indicating the intersection destination of least cost.

6. A method of calculating a route to a destination as defined in claim 1, further comprising a step of removing the dummy link from the intersection destination after the step of selecting the most preferable route to the temporary destination.

7. A method of calculating a route to a destination as defined in claim 1, further comprising a step of replacing the temporary destination with the intersection destination.

8. A method of calculating a route to a destination as defined in claim 7, further comprising a step of starting the route guidance operation to the intersection destination through the selected route.

9. A method of calculating a route to a destination as defined in claim 2, wherein said dummy link is a single link of no length that is used solely in a process of calculating a route to a destination when the destination is an intersection.

10. A method of calculating a route to a destination as defined in claim 9, wherein said data indicating the dummy link differs from the map data indicating link-spot pairs in that it lacks information on absolute positions and attributes.

* * * * *